United States Patent Office 3,084,990
Patented Apr. 9, 1963

3,084,990
SHAPED ARTICLES OF MODIFIED
CELLULOSE ESTERS
Henry Allen Hoffman, Jr., Waynesboro, Va., assignor to E. I. du Pont de Nemours and Company, Wilmington, Del., a corporation of Delaware
No Drawing. Filed Aug. 8, 1958, Ser. No. 753,865
5 Claims. (Cl. 8—129)

This invention relates to articles of organic cellulose derivatives having improved dyeability.

Techniques of forming articles from cellulose esters and the like are well known, especially the procedure of dissolving a cellulose derivative in an organic solvent, extruding the resulting solution through an aperture of suitable shape and size, and removing the solvent to leave a solid shaped article. Of considerable importance are such articles having at least one dimension of a different order of magnitude than at least one other dimension, such as filaments (length much greater than any transverse dimension) and films (thickness only a small fraction of both width and breadth). Certain properties of these articles can be improved by adding minor amounts of a selected modifying agent directly to a solution of a cellulose derivative in an organic solvent. Subsequent evaporation of the solvent allows recovery of the cellulose derivative which then contains the modifier intimately incorporated in its body.

A textile property of particular interest is dyeability. One approach of improving dyeability of cellulose derivatives has been the addition of compounds which contain acidic or basic functional groups. This allows direct attachment, by chemical bonding, of a dyestuff to the articles of manufacture so composed. Thus, where the modifying agent is a compound containing an acid group such as a sulfonic acid group, a basic dyestuff is used. The articles dyed in this way have a satisfactory level of coloration and their fastness properties are substantially improved over those of the conventional disperse-dyed cellulose derivatives.

Modification in the above manner can be obtained only to a limited extent. The existence of a potential incompatibility of the modifying agent in the cellulose substrate is one limitation. Moreover, since only the modifying agent has the acid groups, the ultimate levels of coloration and fastness desired are not always achieved by this method. The undesirable tendency toward solubility in aqueous solvents of modfying agents containing relatively large numbers of polar groups is another limitation. Lastly, relatively large amounts of modifying agent are needed due to the unfavorable distribution situation, and since the agent requires separate preparation and handling, the commerical use of such material is unattractive.

A primary object of the present invention is fast coloration of articles composed of derivatives of cellulose. Another object is modification of cellulose derivatives to include sites for reception of basic dyes. A further object is production of filaments and films of cellulose derivatives having improved affinity for basic dyes without impairment of physical properties thereof. Other objects together with means and methods for obtaining these objects will become apparent from the following description.

In general, the objects of the present invention are accomplished by the use of an organic cellulose derivative soluble in an organic solvent, and containing as part of the polymer structure acid groups available for reaction with basic dyestuffs. For the purposes of the present invention the preferred cellulose derivatives are esters of the lower aliphatic acids, e.g., cellulose acetate, because of its commercial importance and availability and in particular cellulose triacetate because of its desirable thermophysical properties. However, other cellulose derivatives can function equally well provided there is a sufficient number of unreacted hydroxyl groups available for attachment to the modifying group. Included in this group are simple esters of cellulose such as benzoate, formate, propionate, butyrate, isobutyrate, acrylate and crotonate; mixed esters such as cellulose acetate propionate, acetate butyrate, and actate nitrate, as well as other combinations of the simple ester groups; and mixed ether esters such as ethylcellulose acetate.

Shaped articles made from organic cellulose derivatives which contain sufonic acid groups are most useful in the present invention probably because of the strong acidity of the sulfonic acid group. Phosphonic acid groups may be used in place of the sulfonic acid groups, although phosphonic acids are not as acidic as the sulfonic acids. Alkyl-bound carboxylic acid groups, for example those in carboxymethylcellulose acetate and cellulose acetate hydrogen succinate, do not give the pronounced improvement in dyeability characteristic of this invention, presumably because of the weakly acidic properties of such groups. However, the use of aromatic carboxyl compounds with electronegative groups, for example, the nitro group adjacent to the acid linkage gives rise to sufficient acidity to be useful.

As stated above, among the suitable acid groups which the cellulose derivative may bear to qualify as receptive to basic dyestuffs, are sulfonic acid groups or salts thereof. Thus the acid group may be either a dangling —$SO_3H$ group where the valence bond indicates attachment to the polymer, or a hydrolyzable salt thereof in which hydrogen is replaced by a convenient neutralizing cation such as alkali metal, alkaline earth metal, or ammonium or organo-substituted ammonium ion.

To facilitate an understanding of the present invention, reference should be made to the following definitions and explanation of terms. These terms, whenever employed herein, are to be construed in accordance with such definitions and explanations.

Cellulose triacetate refers to acetylated cellulose which contains an average content of about 2.7 to 3.0 acetyl groups per glucose unit. Secondary cellulose acetate signifies reduced acetyl content, within the range of 2.0 to 2.6 acetyl groups per glucose unit, cellulose acetate in the upper part of that range being considered herein as soluble in acetone.

A useful measure of acid modification is the number of milliequivalents of sulfonic acid groups per kilogram of the final article. The value of such a milliequivalent amounts of 0.032 gram of sulfur, which can be determined by the well-known Parr bomb analysis. Assuming a uniform distribution of sulfonic acid groups throughout the final article, the number of such milliequivalents is a useful index of basic dyeability. Three hundred and thirty-six (336) milliequivalents of sulfonic acid groups per kilogram final article indicates a degree of substitution of 0.1 sulfonic acid group per glucose unit in a sample of sulfoethyl cellulose acetate otherwise completely substituted with acetyl groups.

Cellulose derivatives containing fewer substituent groups per glucose unit can obviously be modified to a proportionately greater extent. The useful limits of substitution are from 10–800 milliequivalents of sulfonic acid groups per kilogram of final product, while a range of 20–100 milliequivalents of sulfonic acid groups per kilogram of final product is preferred. It has been found that 10 milliequivalents of sulfonic acid groups per kilogram of final article is required to obtain a practical effect and between 100–200 milliequivalents of sulfonic acid groups per kilogram of final article gives rise to a markedly increased rate of dyeing and some water sensitivity. The level of 800 milliequivalents of sulfonic groups per kilogram of final product is essentially the maximum which is soluble in convential spinning solvents, such as methylene chloride/methanol (85/15) and acetone/water (90/10).

Example I

Five hundred grams of cellulose triacetate which contains 2.91 acetyl groups per glucose unit is dried for 15 hours in an oven maintained at 105° C. The dry cellulose triacetate is dissolved in 2500 grams of pyridine, which has previously been purified by distillation from barium oxide. The resulting solution is heated to 80° C., and is maintained at this temperature while 17 grams of carbyl sulfate (ethionic anhydride) is added in small portions with stirring. After the addition is complete, the temperature is slowly raised to 100° C., and heating at that temperature is continued for 3 hours, after which the solution is poured into a large excess of deionized water to precipitate the product, sulfoethyl cellulose acetate. The precipitate is collected and washed thoroughly with deionized water to remove any color and to eliminate the odor of pyridine. The precipitated sulfoethyl cellulose acetate is given a final wash with a 0.04% solution of sodium carbonate in deionized water, and is dried in air.

Analysis of the sulfoethyl cellulose acetate shows that it contains 2.88 acetyl groups per glucose unit, and 28 milliequivalents of sulfonic acid groups per kilogram of product, i.e., 0.008 sulfonic acid group per glucose unit. The sulfoethyl cellulose acetate is dryspun by conventional methods from a solution of methylene chloride/methanol (85/15) into a 108 denier, 24 filament yarn. The physical properties of this yarn compare favorably with those of the control yarn, unmodified cellulose triacetate of the same degree of acetyl substitution. Results of these measurements are shown below:

| Dry Properties | Sulfoethyl Cellulose Acetate | Control: Cellulose Triacetate |
|---|---|---|
| Tenacity, g./d | 1.20 | 1.20 |
| Elongation, Percent | 33 | 35 |
| Modulus, g./d | 40 | 35 |
| Comp. Ratio | 1.18 | 1.27 |

The sulfoethyl cellulose acetate yarns are dyed to a level of 3% from a 50:1 bath at the boil, using the following dyes: Astrazone Pink FG, Astrazone Yellow 3G, and Astrazone Orange G (Venkataraman, K, "Synthetic Dyes," Academic Press, Inc., New York, page 1174), and the cationic blue dye, N,N'-tetraethyl-3,7-diaminophenoxazine. Prior to fastness evaluations, the dyed yarns are heatset at 220° C. for 1 minute. No sublimation of the dyestuff is observable during this operation. The yarns thus treated show the characteristic X-ray diffraction pattern of heat-set cellulose triacetate. The dyeings pass five No. 3 AATCC (American Association of Textile Chemists and Colorists) wash tests (160° F., 0.5% soap, 0.2% sodium carbonate, 45 minutes) and pass without appreciable change 20 to 40 hours in the Fade-Ometer. Cross-section photomicrographs (400×) of the dyed yarn indicate that dye penetration into the individual filaments of the yarn is substantial.

Example II

Fifty grams of cellulose triacetate containing 2.91 acetyl groups per glucose unit is dissolved in 450 grams of dry methylene chloride. The solution is heated to reflux, and using a trace of sulfuric acid as a catalyst, 2 grams of sulfobenzoic anhydride (93% purity) is added dropwise with stirring. The reaction mixture is allowed to reflux for 3 hours, after which the solvent is removed by pouring the solution into hot deionized water while stirring. The precipitated product is washed several times with portions of hot deionized water, followed with portions of a 0.04% solution of sodium carbonate in deionized water, washed again with deionized water, and finally air dried.

The analysis of the cellulose acetate sulfobenzoate shows that it contains 2.88 acetyl groups per glucose unit, and contains 60 milliequivalents of sulfonic acid groups per kilogram of product, i.e., 0.016 sulfonic acid group per glucose unit. The cellulose acetate sulfobenzoate is dry-spun by conventional methods from a solution of methylene chloride/methanol (85/15) into a 108 denier, 24 filament yarn. The mechanical properties of the yarn compare favorably with those of the control. Physical properties of the cellulose acetate sulfobenzoate yarn are summarized below:

| Dry Properties | Cellulose Acetate Sulfobenzoate | Control: (Cellulose Triacetate) |
|---|---|---|
| Tenacity, g./d | 1.12 | 1.20 |
| Elongation, percent | 31 | 35 |
| Modulus, g./d | 35 | 35 |
| Comp. Ratio | 1.27 | 1.27 |

The yarns are dyed to a level of 3% from a 50:1 bath at the boil, usin gthe dyes mentioned in Example I. The dyed yarns are stable to heat (220° C. for one minute), pass the No. 3 AATCC wash test, and pass 10 to 20 hours in the Fade-Ometer.

Example III

Sulfoethyl cellulose, containing 0.01 sulfonic acid group per glucose unit is acetylated by conventional methods. The resulting sulfoethyl cellulose acetate, which contains 2.90 acetyl groups per glucose unit, is dissolved in methylene chloride/methanol (90/10) to form a viscous spinning dope, and is dry-spun by conventional methods. Yarns of these filaments readily take up basic dyes to give bright clear colors of superior fastness.

The acid-modified cellulose compositions can be obtained by several processes. Sulfopropionic anhydride or o-benzene disulfonic acid anhydride react in the same manner as sulfobenzoic anhydride, and ethionic acid can be used in accord with general teachings of Example II. The use of sulfosuccinic or sulfophthalic anhydride is applicable for this invention, as is the addition of sodium bisulfate to unsaturated esters of cellulose, for example, cellulose acetate crotonate, as disclosed in U.S. 2,321,069 to Dreyfus. For the above reactions, where acid catalysts are used, the reaction conditions are selected which permit adequate substitution and at the same time control degradation during the course of the reaction.

Thus the acid-modified cellulose compositions may have the sulfonic acid group attached to the polymer chain through ether linkages such as alkoxy, aryloxy and aralkoxy groups or through ester linkages such as

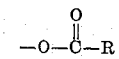

where R is alkyl, aryl or aralkyl. The alkyl and alkoxy groups are preferably lower alkyl and alkoxy i.e., up to six carbon atoms and the aryl groups are preferably phenyl. As examples of such ether groupings which are attached to the cellulosic chain are sulfoethoxy, sulfopropoxy, sulfobenzoxy, sulfobenzyloxy, etc. Among suitable ester groupings are sulfopropionate, sulfobenzoate, sulfosuccinate, sulfophthalate, etc.

As examples of suitable acid-modified cellulose compositions coming within the scope of the present invention, there may be mentioned in addition to those disclosed previously, sulfopropyl cellulose acetate and its sodium salt, sulfobenzyl cellulose acetate and its ammonium salt, the triethyl ammonium salt of cellulose acetate sulfobenzoate, cellulose acetate sulfosuccinate, cellulose acetate sulfophthalate, sulfonated cellulose acetate crotonate, etc.

The example illustrate that the acidic modifying group can be introduced prior to (Example III) or subsequent to (Examples I and II) the acylation reaction, depending on the nature of the substituents and the extent of modification which is desired.

Basic dyestuffs which are suitable for use with the articles of this invention in addition to those previously disclosed includes those with the following Colour Index numbers:

| | |
|---|---|
| 749 (Red) | 662 (Green) |
| 677 (Magneta) | 663 (Blue) |
| 21 (Yellow) | 658 (Blue) |
| 657 (Green) | 681 (Violet) |

Also well-suited to this purpose are the various quaternary anthraquinoyl aminoalkylammonium salts, such as those mentioned by Tatum in U.S. 2,153,012.

Basic dyeable cellulose derivatives permit a higher degree of sublimation fastness, light fastness, fume fastness, and wash fastness than can now be obtained with disperse dyes. In addition, a new range of colors is made available for use in the trade. Commercial dyeing can be made more versatile with the articles of this invention, since disperse dyeability is retained. This property permits many useful and attractive effects using cross dyeing and union dyeing techniques, as well as fabric printing, based on the non-staining property of the basic dyes during washing.

Articles composed according to this invention retain basic dye colors much better than articles of unmodified cellulose derivatives dyed in the usual manner or than modified cellulose derivatives dyed with direct or acid dyestuffs, and at less expense. Moreover, no adverse effects on the physical properties of shaped article results. In addition, the articles of this invention differ from basic dyeable cellulose derivatives made from mixtures of cellulose derivatives and sulfonate-bearing additives in that each polymer chain contains sulfonic acid groups available as sites for basic dye attachment, while in the products from mixtures, only the additive contains the dye sites. The resulting uniform distribution of dye sites in the present articles substantially reduces the extent of modification necessary, while at the same time increasing the extent of pentration of the dye into the body of the article, which makes possible increased levels of coloration and fastness.

I claim:

1. A shaped article consisting essentially of cellulose acetate having attached to the polymer chain through ester linkages from 10 to 800 milliequivalents of a group selected from the class consisting of sulfonic acid and hydrolyzable salts thereof per kilogram of product.

2. A filament consisting essentially of cellulose triacetate having attached to the polymer chain through ester linkages from 10 to 800 milliequivalents of sulfonic acid groups per kilogram of final product.

3. A spinning solution consisting essentially of a member of the group consisting of cellulose esters and ether esters having attached to the polymer chain through ester linkages from about 10 to 800 milliequivalents of sulfonic acid groups receptive to basic dyestuffs per kilogram of cellulosic material in an organic solvent.

4. A filament consisting essentially of sulfoethyl cellulose acetate having from 10 to 800 milliequivalents of sulfonic acid groups per kilogram of product.

5. A filament consisting essentially of cellulose acetate sulfobenzoate having from 10 to 800 milliequivalents of sulfonic acid groups per kilogram of product.

References Cited in the file of this patent

UNITED STATES PATENTS

| | | |
|---|---|---|
| 1,833,286 | Hagedorn et al. | Nov. 24, 1931 |
| 1,933,815 | Malm et al. | Nov. 7, 1933 |
| 2,127,236 | Schlack | Aug. 16, 1938 |
| 2,492,977 | Fordyce et al. | Jan. 3, 1950 |
| 2,849,330 | Hoffman et al. | Aug. 26, 1958 |
| 3,019,119 | Hoffman et al. | Jan. 30, 1962 |

OTHER REFERENCES

Textile Colorist, December 1931, pp. 834–837.